United States Patent [19]
Tajkowski et al.
[11] 4,401,584
[45] Aug. 30, 1983

[54] SOLVENT BASED DEWATERING SYSTEM WITH DEMULSIFIER

[75] Inventors: Edward G. Tajkowski, Williamsville, N.Y.; Aaron Colbert, Livingston, N.J.

[73] Assignee: Allied Corporation, Morris Township, Morris County, N.J.

[21] Appl. No.: 379,241

[22] Filed: May 17, 1982

[51] Int. Cl.[3] .......... C11D 3/4; F26B 5/00; B01D 43/00

[52] U.S. Cl. .......... 252/194; 34/9; 252/358; 252/364

[58] Field of Search .......... 252/194, 358, 364; 34/9, 60, 72

[56] References Cited

U.S. PATENT DOCUMENTS

| | | | |
|---|---|---|---|
| 3,095,381 | 6/1963 | Tinnon et al. | 252/161 |
| 3,386,181 | 6/1968 | Steinacker | 34/9 |
| 3,553,142 | 1/1971 | Figiel et al. | 252/364 |
| 3,559,297 | 2/1971 | Figiel | 34/9 |
| 3,589,023 | 6/1971 | Figiel | 34/9 |
| 3,710,450 | 6/1973 | Figiel | 34/9 |
| 3,926,862 | 12/1975 | Figiel et al. | 252/545 |
| 3,962,798 | 6/1976 | Jackson | 34/9 |
| 4,045,365 | 8/1977 | Figiel | 252/364 |
| 4,055,054 | 10/1977 | Murphy et al. | 252/364 |
| 4,144,187 | 3/1979 | Hutchinson | 252/364 |
| 4,172,044 | 10/1979 | Zeidler et al. | 252/358 |

*Primary Examiner*—Irwin Gluck
*Attorney, Agent, or Firm*—Arthur J. Plantamura; Jay P. Friedenson

[57] ABSTRACT

Surfactant-modified, 1,1,2-trichloro-1,2,2-trifluoroethane solvent compositions are provided which contain small but effective amounts, i.e., about 0.2 to about 0.5 weight percent of solvent soluble/water insoluble surfactant and/or surfactant demulsifiers and adjust to accommodate. Of particular significance are the compositions containing N-acylated sarcosine surfactants and demulsifiers of the group acetylenic diols, aliphatic primary alcohols of 6 to 12 carbon atoms, and alkyl phosphate triesters of 3 to 12 carbon atoms. The demulsifier containing compositions have the properties of effectively and essentially completely displacing water or aqueous solutions from many substrates and, even under conditions of severe agitation, separating them for removal by decantation from the solvent layer without the drawback of forming stable emulsions that prevent said decantation and interfere with sufficient processing of the solvent drying compositions through the drying apparatus.

7 Claims, No Drawings

SOLVENT BASED DEWATERING SYSTEM WITH DEMULSIFIER

DESCRIPTION

BACKGROUND OF THE INVENTION

This invention relates to improved surfactant-solvent drying compositions which include a volatile solvent that has the capability of removing water or other aqueous films from the surface of substrates. Removal of the water from the substrate to be dried is effected by displacement; drying in this manner avoids an energy consuming drying step and, in the case of metals, avoids potential corrosion attendant after the use of aqueous cleaning methods.

Volatile solvent drying compositions used in the past have often proved less than satisfactory by failing to effectively displace water from the surface to be dried. To overcome this difficulty, in accordance with the invention, certain sarcosine surfactants have been found to provide highly advantageous results in promoting water displacement from surfaces that require drying.

An additional and serious problem encountered with varying severity in the use of solvent drying solutions, depending on the specific application and substrate to be dried, is the fact that such solutions tend to emulsify and are difficult to purify or to be freed of aqueous impurities so that the drying solution can be reused. The presence of emulsions in these drying compositions interferes with the free elimination of water, such as by decantation, and ultimately interrupts the water-displacement process which is the essential objective of the substrate drying treatment.

Various surfactants have been used to solve this problem of finding a good drying solvent while dealing effectively with the emulsification problem, with little success. For example, surfactants that do not cause emulsification usually dry poorly while good water-displacing surfactants usually cause emulsification of the displaced water.

It is thus apparent that a need exists for an effective solvent/surfactant surface drying system and, particularly, a system which is readily renewable by separating the water accumulated therein during use without encountering substantial interference by the presence of an emulsion phase.

SUMMARY OF THE INVENTION

It is an object of the present invention to provide drying solvent compositions which have improved drying capabilities and can suitably withstand severe use by their water desorption and rejection abilities. A more particular object of the invention is to provide an effective drying solvent composition that resists the formation of stable emulsion. The solvent of the invention comprises a normally liquid fluorocarbon in combination with small amounts of sarcosine surfactants and certain other surface-active materials that are compatible with the above solvent and sarcosine surfactant composition.

The combination of these surfactants with certain solvent soluble, water-insoluble demulsifiers such as (1) acetylenic diols, e.g., 2,4,7,9-tetramethyl-5-decyn-4,7-diol; and mixtures thereof with (2) aliphatic primary alcohols, e.g., those in the range of hexanol to dodecanol at relatively low concentrations; and (3) phosphate triesters having three to twelve carbon atoms in quantities approximately comparable to the total surfactant present, inhibits the formation of stable emulsion. The emulsion control effects of this combination of demulsifiers, moreover, is better than when either additive is used alone at the full total amount of the additives.

The drying composition of the invention comprises the fluorocarbon 1,1,2-trichloro-1,2,2-trifluoroethane (FC-113).

The sarcosines which may satisfactorily be used as the first category of surfactants are acylated sarcosines of the following formula:

$$RCON(CH_3)CH_2COOH$$

wherein R is an alkyl or alkenyl substituent of 10–20 carbon atoms. R may also consist of a mixture of such substituents encompassing the above range of carbon atoms.

The additives of the second category employed in preventing the formation of stable emulsions in the use of the foregoing surfactant-containing solvent drying systems are selected from the group consisting of the following kinds:

1. Acetylenic diols, for example, 2,4,7,9-tetramethyl-5-decyn-4,7 diol which is available as SURFYNOL® 104 from Airco Chemical Company. Other related acetylenic diols such as; 3,6-dimethyl-4-octyne-3,6-diol (SURFYNOL-82) or 2,5,8,11-tetramethyl-6-dodecyn-5,8-diol (SURFYNOL 124) may also be used.
2. Aliphatic primary alcohols particularly those aliphatic primary alcohols having from six to twelve carbon atoms. These may be used singly or as mixtures of alcohols in this range; and
3. Phosphate tri-esters having ester carbon atoms chains of from three to twelve carbon atoms.

DESCRIPTION OF THE PREFERRED EMBODIMENTS

In accordance with the invention, solvent-drying compositions which are very effective in displacing water, particularly from metal surfaces, and which inhibit the formation of undesirable stable emulsions under even vigorous conditions of use, are provided.

In the solvent-drying solutions of the invention, the organic fluorocarbons are those compositions having a boiling point range of between about 45° C. and 50° C., such as the trichlorotrifluoroethanes, particularly preferred is the compound 1,1,2-trichloro-1,2,2-trifluoroethane.

The sarcosines employed in the compositions of the invention are used in amounts of from 0.05 weight percent to about 1.0 weight percent and preferably in the range of from about 0.1 to about 0.5 weight percent. Suitable sarcosines are the N-acylated sarcosines of the formula $$RCON(CH_3)CH_2COOH$$

wherein R is a saturated or unsaturated hydrocarbon substituent of from 10 to 18 carbon atoms.

Suitable sarcosines within this category include N-lauroyl sarcosine having a formula $CH_3(CH_2)_{10}CON(CH_3)CH_2COOH$, N-cocoyl sarcosine which is a mixture of $C_{11}H_{23}CON(CH_3)CH_2COOH$ and $C_{13}H_{27}CON(CH_3)CH_2COOH$; N-oleoyl sarcosine having a formula which is essentially at least 80% N-oleoyl sarcosine, $C_{17}H_{33}CON(CH_3)CH$-

$_2COOH$, and the balance being other fatty acid moieties, and the like sarcosines, and mixtures thereof.

The demulsifier which may be employed in amounts comparable to the surfactant, i.e., in an amount of from about 0.05 weight percent to about 1 weight percent, preferably is amounts of about 0.1 to about 0.5 weight percent, is one or more of those from the following group:

1. acetylenic diols such as, 2,4,7,9-tetramethyl-5-decyn-4,7 diol, bearing a brand name SURFYNOL 104;
2. aliphatic primary alcohols having from six to twelve carbon atoms, preferably the n-octyl alcohol
3. phosphate esters having carbon atom substituents of three to twelve carbon atoms, typically, tri-n-butyl phosphate.

The relative weight of demulsifier to surfactant in the composition may vary from about a ratio of 1:8 to 8:1 but preferably is maintained within the ratio of 1:4 to 4:1, with approximately equal amounts of surfactants and demulsifiers being most advantageous in most instances.

It has been found that even more beneficial results are derived when the demulsifier materials are used in combination with each other, e.g., such as by combining the acetylenic diol type with the primary aliphatic alcohol type, or with the phosphate tri-ester type. The relative proportions of the two types of demulsifiers may vary from 1:4 to 4:1 parts by weight, usually are preferably used in a 1:1 ratio by weight. For example, a preferred composition would include a 1:1 weight ratio of (SURFYNOL-104) 2, 4, 7, 9-tetramethyl-5-decyn-4,7-diol and n-octanol as the demulsifier material.

It has been found that the compositions of the present invention possess certain variable advantages over prior art compositions in that a solvent as described may be used for relatively long periods without formation of significant amounts of stable emulsion) thereby avoiding the difficulties in recirculating the solvent and avoiding clogging of the circulating apparatus.

While the drying compositions of the present invention preferably comprise those that are stabilized against formation of emulsions, it will be understood, nevertheless, that in some cases the drying solutions, per se, without demulsifier are also advantageous. We have found that the drying compositions containing the sarcosine surfactants, where applied in processes that do not give rise to formation of substantial amounts of stable emulsion, or where such emulsion that does form may be practically removed such as by skimming from the system, may be used without demulsifier to provide a superior drying composition. This will be apparent from the examples provided hereinafter, wherein some examples illustrate compositions that are superior drying media although not necessarily substantially resistant to the formation of emulsion. Accordingly where an application requires that there be substantial absence of emulsion, such drying compositions are selected which afford this important property of being resistant to stable emulsion formulation.

In order to differentiate qualities of performance among the various compositions, for ability to displace water from wet substances and for ability to give good separations between water and solvent phases, the following test methods were used. The "Minimum Time Test" measures the efficiency of water-displacement performance and is conducted as follows:

WATER DISPLACEMENT PERFORMANCE—MINIMUM TIME TEST (1) A stainless-steel beaker, of about 2-liter capacity is fitted with a cooling-coil of several turns of tubing that conforms closely to the inner surface of the upper part of the beaker. The coil is connected to a source of cooling fluid. This arrangement is referred to as a "boiling sump".

(2) The boiling sump is charged with 500 ml of the solution to be tested and is placed upon a thermostatted hot plate. The solution is heated to rolling boil and is refluxed off the surface of the cooling coil.

(3) Segments, i.e., "coupons" having an approximate size 18 mm×76 mm (about ¾ inches by 3 inches) of the substrates to be tested are pre-cleaned to a condition of no-water-break cleanliness (a terminology used by those who work in the field of surface-finishing metals and other substrates to refer to a surface condition essentially free of oil film). The coupons are attached to suspension means and are wetted with water just prior to the test. The wetted coupon is completely immersed for a pre-determined time, e.g., ten seconds, in the boiling test solution. It is then raised into the vapor region above the liquid and held there for 30 sec. The coupon is then removed and examined for the presence of water on the surface. If it is dry, the process is repeated with fresh, wet coupons for shorter immersion times until "failure," i.e. a wet surface, occurs. If the coupon is wet at ten seconds, then longer immersion times are used, successively, until complete water-displacement, i.e. a dry surface, is accomplished. "Minimum time for displacement" is reported as the immersion times (seconds) between "wet" and "dry" surface conditions upon removal from the boiling sump. The shorter the time for drying, the better the water-displacement efficiency.

The "Phase-Separation Rate Test" outlined below measures the relative rates for separation of the water and solvent phases which is related to the emulsion formation and is conducted as follows:

PHASE-SEPARATION TEST (1) This test simulates the agitation imparted to a liquid by a centrifugal circulating pump such as may be found on a vapor-phase degreasing machine that has been modified to perform an efficient water-displacement function. This test also measures the relative rates of separation for aqueous and solvent phases after the end of the agitation period. The more rapid and complete the separation of the phases, the more potentially useful is the solvent-surfactant composition in a drying machine.

(2) The test is run in a Waring® Blender (Waring Products Co.), Model 1088. The test is done at "low" speed and the built-in timer is set for ten-second running time. A one-pint jar with a tightly-fitting screw cap is used. Separation rate measurements are made in eight-ounce, tall, straight-sided wide-mouth glass jars that have screw caps.

(3) The test is conducted with a 180-ml portion of the solvent solution in the jar of the blender. To this portion is added 18 ml (10 vol%) of the aqueous phase material: water, or other aqueous process solution. The jar is closed tightly and the blender is run at "low" speed for ten seconds. The dispersion is immediately poured over into a measurement jar and the initial time is noted. Total volume height in the jar is measured along the outside of the jar with a ruler or dividers. Further readings of the depth of each phase are taken at 5, 10, 20, 30 and 60 min. of elapsed time. For each reading, the depth of each clear phase, from its top or bottom to the corresponding surface at the interface layer, is measured.

(4) These depths are than calculated as volume percents of the original total volume, or as proportions of the original phase volumes. The volume proportions may then be plotted against elapsed time for each phase and curved are obtained that show relative separation dynamics for the various mixtures. Alternatively, separation percentages for the phases at 30 and/or 60 minutes may be used for comparing relative performances of the mixtures being tested.

(5) In each case, any formation of a stable emulsion in a phase or at the interface is noted. The depth of such an emulsion is subtracted from the depth of corresponding clear phase for purposes of calculating the percent separation of that phase. For example, a stable emulsion in the aqueous phase after 60 minutes standing is zero separation of that phase, even if the solvent phase becomes completely clear.

Specific examples of the effectiveness of the compositions of the invention are summarized in the following tables. Parts and percentages are expressed by weight except as otherwise noted.

Table I shows mixtures of N-acyl sarcosine surfactants with solvent and with, or without, demulsifier additives; these were used for choosing advantageous surfactant compositions. Performance results for these mixtures when tested according to the methods described above are shown in Table II.

Table III shows compositions that were used to differentiate among the various demulsifier materials in order to choose the most advantageous ones. The qualities of phase-separations for these compositions are shown in Table IV.

Table V shows the qualities of relative water-displacement capabilities for these same compositions i.e. the composition of Examples 11-19.

Table VI shows compositions and results of performance tests, as described above, for mixtures used to evaluated the relative utilities of fluorocarbon solvents that might be used in practicing this invention.

TABLE I

COMPOSITIONS OF TEST SOLUTIONS USED FOR COMPARISONS AMONG SARKOSYL ® SURFACTANTS IN WATER-DISPLACING SOLVENT SOLUTIONS

| Composition Number | SARK O[a] | SARK L[b] | SARK LC[c] | SURF. 104[d] | n-OCT-ANOL | FC 113[5] |
|---|---|---|---|---|---|---|
| Control | | | | | | 100 |
| 1 | 0.10 | — | 0.10 | — | — | 99.8 |
| 2 | 0.10 | — | 0.10 | 0.30 | — | 99.5 |
| 3 | — | — | 0.20 | 0.30 | — | 99.5 |
| 4 | 0.10 | — | 0.10 | 0.15 | 0.15 | 99.5 |
| 5 | — | — | 0.20 | 0.15 | 0.15 | 99.5 |
| 6 | 0.10 | — | 0.10 | — | 0.20 | 99.6 |
| 7 | — | — | 0.20 | — | 0.20 | 99.6 |
| 8 | — | 0.20 | — | 0.15 | 0.15 | 99.5 |
| 9 | 0.10 | 0.10 | — | 0.15 | 0.15 | 99.5 |
| 10 | — | 0.20 | — | — | — | 99.8 |

[a]SARKOSYL "O" (Oleoyl Sarcosine) Ciba-Geigy Co.
[b]SARKOSYL "L" (Lauroyl Sarcosine) Ciba-Geigy Co.
[c]SARKOSYL "LC" (Cocoyl Sarcosine) Ciba-Geigy Co.
[d]SURFYNOL-104 (2,4,7,9-Tetramethyl-5-Decyn-4,7 Diol) Airco Chemical Co
[5]FC-113 is 1,1,2-Trichloro-1,2,2-Trifluoroethane

TABLE II

COMPARISON OF PERFORMANCES OF SARKOSYL-SURFACTANT COMPOSITIONS IN FC-113 SOLVENT

| COMPOSITION NUMBER[a] | PHASE SEPARATION VOL. %[b] | MINIMUM TIME, SEC.[c] Al | Brass | SS304[d] |
|---|---|---|---|---|
| Control | 100 | Wet | Wet | Wet |
| 1 | ZERO | 1 | 1 | 1 |
| 2 | 29 | 1 | 1 | 1 |
| 3 | 39 | — | — | 5-10 |
| 4 | 87 | 1 | 1 | 1-2 |
| 5 | 39 | — | — | >30 |
| 6 | ZERO | — | — | 1-2 |
| 7 | 48 | — | — | 13-15 |
| 8 | 29 | 1 | 1 | 2-3 |
| 9 | 49 | 1 | 1-2 | 2-3 |
| 10 | ZERO | 1 | 1 | 1 |

[a]As given in Table I
[b],[c]As measured by test method given in text
[d]Stainless steel, alloy No. 304.

TABLE III

COMPOSITIONS OF SOLVENT-DRYING MIXTURES USED IN EXAMPLES CITED BELOW

| EXAMPLE NUMBER | INGREDIENTS, WT. % SARK.[a] O | SARK.[b] LC | SURF.[c] 104 | n-OCT.[d] OH | NEO.[e] 91 | TNBP[f] | F-C 113 | |
|---|---|---|---|---|---|---|---|---|
| 11 | 0.10 | 0.10 | NONE | NONE | NONE | NONE | 99.8 | (Comparative)[g] |
| 12[h] | COMMERCIAL PRODUCT (COMPARATIVE) | | | | | | | |
| 13 | 0.10 | 0.10 | 0.30 | NONE | NONE | NONE | 99.5 | |
| 14 | 0.10 | 0.10 | NONE | 0.20 | NONE | NONE | 99.6 | |
| 15 | 0.10 | 0.10 | 0.15 | 0.15 | NONE | NONE | 99.5 | |
| 16 | 0.10 | 0.10 | 0.10 | 0.20 | NONE | NONE | 99.5 | |
| 17 | 0.10 | 0.10 | 0.20 | 0.10 | NONE | NONE | 99.5 | |
| 18 | 0.10 | 0.10 | 0.15 | NONE | 0.15 | NONE | 99.5 | |
| 19 | 0.10 | 0.10 | 0.15 | NONE | NONE | 0.15 | 99.5 | |

[a]SARKOSYL-O, Ciba-Geigy Co.
[b]SARKOSYL-LC, Ciba-Geigy Co.
[c]SURFYNOL 104, Air Products and Chemicals Co.
[d]n-octanol, B.P. 194-196° C.
[e]NEODOL 91, Shell Chemical Co.
[f]TNBP - Tri-n-Butyl Phosphate
[g]No demulsifier additive.
[h]Solution of amine salt of phosphoric acid ester, in FC-113, sold as a commercial drying product.

TABLE IV

QUALITY OF PHASE-SEPARATION VS. COMPOSITION FOR MIXTURES CONTAINING 0.10 WT. % EACH OF SARKOSYL "O" AND "LC", ADDITIVES AS INDICATED, AND BALANCE OF F-C113

| EXAMPLE NUMBER | INGREDIENTS, WT. % SURF. 104 | n-OCT. OH | NEO. 91 | TNBP | PHASE-SEPARATION[a], % |
|---|---|---|---|---|---|
| 11 | NONE | NONE | NONE | NONE | ZERO (Comparative) |
| 12 | | | COMM'L PRODUCT | | ZERO (Comparative) |
| 13 | 0.30 | NONE | NONE | NONE | 29 |
| 14 | NONE | 0.20 | NONE | NONE | ZERO |
| 15 | 0.15 | 0.15 | NONE | NONE | 87 |
| 16 | 0.10 | 0.20 | NONE | NONE | 95 |
| 17 | 0.20 | 0.10 | NONE | NONE | 38 |
| 18 | 0.15 | NONE | 0.15 | NONE | 95 |
| 19 | 0.15 | NONE | NONE | 0.15 | 90 |

[a]As measured by test method given in text.

TABLE V

QUALITY OF WATER-DISPLACEMENT FROM TEST SUBSTRATES FOR MIXTURES CONTAINING 0.10 WT. % EACH OF SARKOSYL "O" AND- "LC", ADDITIVES AS INDICATED, AND BALANCE OF F-C 113.

| EXAMPLE NUMBER | INGREDIENTS, WT. % SURF. 104 | n-OCT. OH | NEO. 91 | TNBP | MINIMUM TIME, SEC.[a] Al | Brass | SS304[b] |
|---|---|---|---|---|---|---|---|
| 11 | | CONTROL | | | 1 | 1 | 1 |
| 12 | | PROP. COMM'L PRODUCT | | | 1 | 1 | 1 |
| 13 | 0.30 | | NONE | | 1 | 1 | 1 |
| 14 | NONE | 0.20 | NONE | NONE | 1 | 1-2 | 1-2 |
| 15 | 0.15 | 0.15 | NONE | NONE | 1 | 1 | 1 |
| 16 | 0.10 | 0.20 | NONE | NONE | 1 | 3-5 | 5-10 |
| 17 | 0.20 | 0.10 | NONE | NONE | 1 | 3-5 | 3-5 |
| 18 | 0.15 | NONE | 0.15 | NONE | 1-2 | 1-2 | 60 |
| 19 | 0.15 | NONE | NONE | 0.15 | 1 | 5-8 | 2-3 |

[a]As measured by test method given in text.
[b]Stainless steel, Alloy No. 304

TABLE VI

COMPARATIVE PERFORMANCE OF OTHER FLUOROCARBON SOLVENTS BLENDS IN WATER-DISPLACEMENT COMPOSITIONS[a] WITH FC-113

| EXAMPLE NUMBER | F-C SOLVENT | PHASE-SEP'N, % | MIN. TIME, SEC. Al | Brass | S.S.304[d] |
|---|---|---|---|---|---|
| 20 | FC-113 | 87 | 1 | 1 | 1 |
| 21 | FC-11 | 6 | 8-10 | 18-20 | N.D. |
| 22 | BLEND A[b] | — | N.D. | N.D. | N.D. |
| 23 | BLEND B[c] | — | N.D. | N.D. | N.D. |
| 24 | FC-123 | 100% | N.D. | N.D. | N.D. |

N.D. No water-displacement effect
[a]SARKOSYL "O" AND- "LC", (0.10 wt. % each) SURFYNOL 104 (0.15 wt. %) n-Octanol, (0.15 wt. %); and Solvent, (99.5 wt. %)
[b]BLEND A 50.5 wt. % F-C 113, and 49.5 wt. % methylene chloride
BLEND B 39.1 wt. % F-C 113, and 51.6 wt. % methylene chloride and 9.3 wt. % cyclopentane
[d]Stainless steel, Alloy No. 304

It will be apparent to those skilled in the art that various changes may be made in the proportions and additive ingredients of the compositions described herein. Other drying applications for these surfactant demulsifier blends would readily suggest themselves to those skilled in the art.

What is claimed is:

1. A solvent-surfactant drying composition comprising:

(a) 1,1,2-trichloro-1,2,2-trifluoroethane, and containing (b) from about 0.05 to about 1 weight percent of at least one N-acylated sarcosine of the formula $RCON(CH_3)CH_2COOH$ wherein R is an alky or alkylene substituent of 10 to 20 carbon atoms.

2. The drying composition of claim 1 which is inhibited against the formation of stable emulsions by the addition of (c) from about 0.05 to about 1 weight percent of a demulsifier selected from the group consisting of acetylenic diols and mixtures thereof with (ii) aliphatic primary alcohols of six to twelve carbon atoms and (iii) phosphate tri-esters having carbon substituents of three to twelve carbon atoms.

3. The composition of claim 1 wherein (b) is a mixture of (i) a sarcosine selected from the group consisting of N-lauroyl sarcosine, N-cocoyl sarcosine and (ii) N-oleoyl sarcosine.

4. The composition of claim 2 wherein the demulsifier is 2,4,7,9-tetramethyl-5-decyn-4,7 diol and an aliphatic primary alcohol of six to twelve carbon atoms.

5. The composition of claim 4 wherein the aliphatic primary alcohol is n-octyl alcohol.

6. The composition of claim 2 wherein (a) is 1,1,2-trichloro-1,2,2-trifluoroethane, (b) is a mixture of oleoyl sarcosine and cocoyl sarcosine and the demulsifier (c) is a mixture of 2,4,7,9-tetramethyl-5-decyn-4,7-diol and n-octanol.

7. The composition as in either of claims 2 or 6 wherein the total amount of each of (b) and (c) is from about 0.1 to about 0.5 weight percent.

* * * * *